(No Model.)
R. VAN BUREN & J. J. POWERS.
ELECTRIC CONDUIT.
No. 376,562. Patented Jan. 17, 1888.
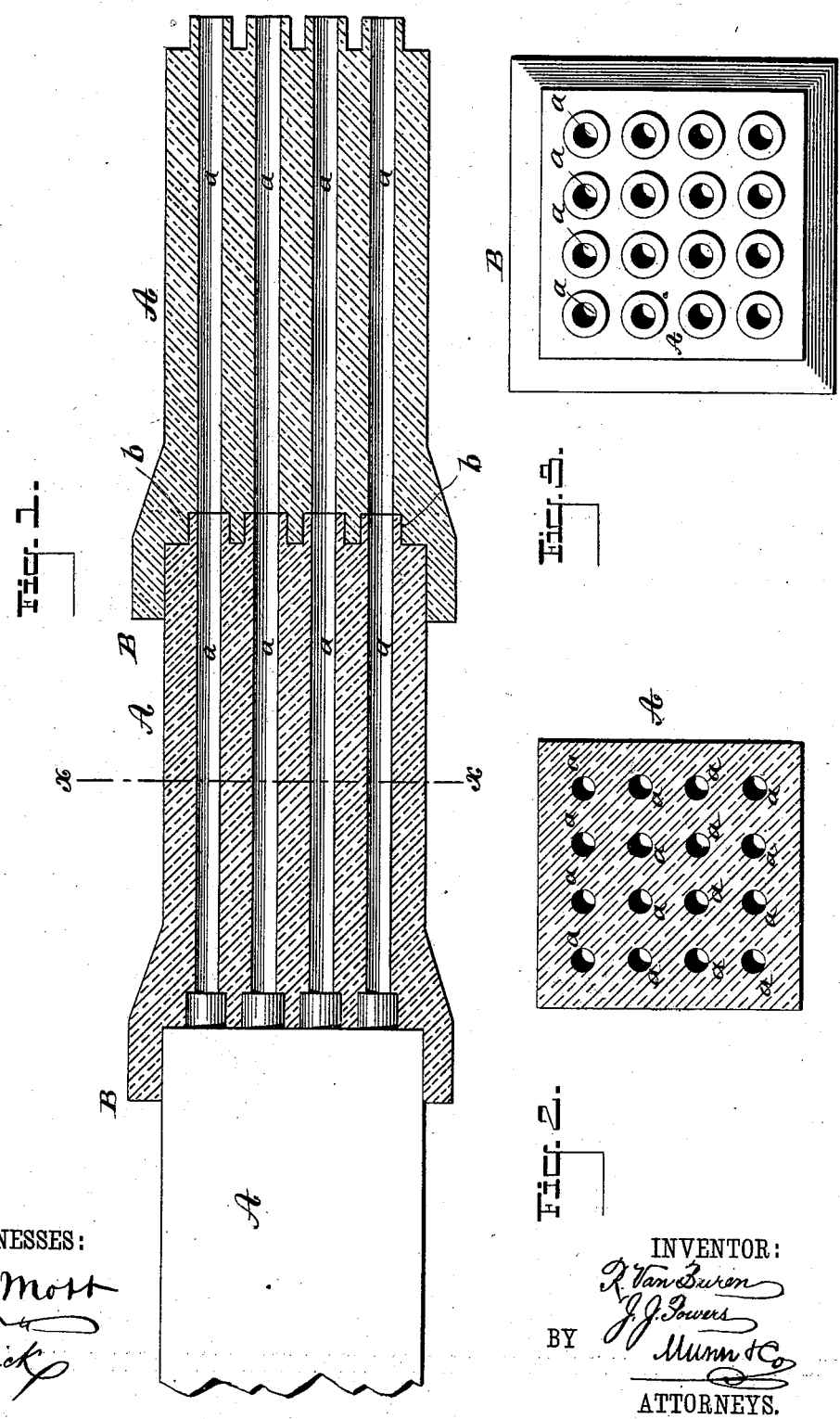

UNITED STATES PATENT OFFICE.

ROBERT VAN BUREN AND JAMES J. POWERS, OF BROOKLYN, NEW YORK.

ELECTRIC CONDUIT.

SPECIFICATION forming part of Letters Patent No. 376,562, dated January 17, 1888.

Application filed October 21, 1887. Serial No. 252,968. (No model.)

*To all whom it may concern:*

Be it known that we, ROBERT VAN BUREN and JAMES J. POWERS, both of Brooklyn, in the county of Kings and State of New York, have invented a new and Improved Electric Conduit, of which the following is a specification, reference being had to the annexed drawings, forming a part thereof, in which—

Figure 1 is a side elevation, partly in section, of our improved conduit. Fig. 2 is a transverse section taken on line $x\ x$ in Fig. 1, and Fig. 3 is an end elevation.

Similar letters of reference indicate corresponding parts in all the views.

The object of our invention is to construct a subway for electric conductors in which perfect insulation and protection from the effects of moisture may be secured.

Our invention consists in a conduit formed of sections of non-conducting material, perforated longitudinally for receiving the electrical conductors and provided with recesses or sockets at one end and tubulated at the opposite end, so that the sockets of one section will receive the projecting portions of the adjacent section, thereby making continuous conduits or channels for receiving electrical conductors.

In carrying out our invention we construct the sections A of the conduit of glass, porcelain, or other insulating material, with longitudinal perforations $a$ for receiving the electrical conductor. One end of each section is provided with a socket, B, for receiving the entire end of the adjacent section. The opposite end of the section is tubulated, and the tubulated portions of each section are received in small recesses $b$, formed at the socket end of the section around the ends of the longitudinal perforations $a$. The joints between the sections are protected by thin packing or waterproof cement. The electrical conductors, which are introduced into the longitudinal perforations $a$, require no insulation other than that furnished by the conduit sections A, by which they are inclosed, except in cases where a number of conductors are introduced into each compartment of the conduit.

In the construction of our improved conduit we use plain or glazed earthenware, glass, cement, or other approved insulating material which will be durable when placed under ground, and which will exclude moisture.

Having thus fully described our invention, we claim as new and desire to secure by Letters Patent—

As an improved article of manufacture, a longitudinally-perforated conduit-section formed of insulating material tubulated at one end and provided with a socket, B, and a series of recesses, $b$, at the other end, as set forth.

ROBERT VAN BUREN.
JAMES J. POWERS.

Witnesses:
GEO. M. HOPKINS,
C. SEDGWICK.